United States Patent
Levandoski et al.

(10) Patent No.: US 8,110,067 B2
(45) Date of Patent: Feb. 7, 2012

(54) LOW RATIO RTV COMPOSITIONS AND METHODS FOR MAKING SAME

(75) Inventors: Michael P. Levandoski, Bristol, CT (US); Jennifer Lynn Smith McCarthy, Wareham, MA (US)

(73) Assignee: Henkel Corporation, Rocky Hill, CT (US)

( * ) Notice: Subject to any disclaimer, the term of this patent is extended or adjusted under 35 U.S.C. 154(b) by 215 days.

(21) Appl. No.: 12/562,433

(22) Filed: Sep. 18, 2009

(65) Prior Publication Data

US 2010/0006224 A1    Jan. 14, 2010

Related U.S. Application Data

(63) Continuation of application No. PCT/US2008/007189, filed on Jun. 9, 2008.

(60) Provisional application No. 60/943,074, filed on Jun. 11, 2007.

(51) Int. Cl.
*C09J 201/10* (2006.01)
*C08L 83/06* (2006.01)

(52) U.S. Cl. ........................... 156/329; 524/860

(58) Field of Classification Search ............... 156/329; 524/860

See application file for complete search history.

(56) References Cited

U.S. PATENT DOCUMENTS

| | | | |
|---|---|---|---|
| 3,819,563 A | 6/1974 | Takago et al. | |
| 4,180,642 A | 12/1979 | Takago | |
| 4,454,262 A | 6/1984 | Fukayama et al. | |
| 4,721,765 A | 1/1988 | Inoue et al. | |
| 4,721,766 A | 1/1988 | Inoue et al. | |
| 5,346,940 A * | 9/1994 | Brassard et al. | 524/267 |
| 5,525,660 A | 6/1996 | Shiono et al. | |
| 5,708,076 A | 1/1998 | Tsuji et al. | |
| 5,936,032 A | 8/1999 | Angus, Jr. | |

FOREIGN PATENT DOCUMENTS

KR    10-0258160    6/2000

* cited by examiner

*Primary Examiner* — Katarzyna Wyrozebski Lee
*Assistant Examiner* — Daniel Lee
(74) *Attorney, Agent, or Firm* — Steven C. Bauman

(57) ABSTRACT

A two-part moisture-curing composition having as a first part water and an hydroxy-terminated diorganosiloxane; and a second part which includes a reactive silicone, at least one end-capping silane which includes one or more enoxy groups, at least one end-capping catalyst and at least one moisture cure catalyst. Enhanced and controlled cure speed is obtained by these compositions.

18 Claims, No Drawings

LOW RATIO RTV COMPOSITIONS AND METHODS FOR MAKING SAME

RELATED U.S. APPLICATION DATA

This application continues from International Patent Application No. PCT/US2008/007189, filed Jun. 9, 2008, which claims the benefit of an earlier filing date from U.S. Provisional Application No. 60/943,074, filed Jun. 11, 2007 the disclosures of each of which hereby being expressly incorporated herein by reference.

FIELD OF THE INVENTION

The present invention relates to silicone moisture-curing compositions. More particularly, the present invention relates to low ratio, two-part RTV compositions which cure upon mixing without requiring the presence of atmospheric moisture.

BRIEF DESCRIPTION OF RELATED TECHNOLOGY

Conventional room temperature vulcanizing siloxanes have the disadvantage of inefficient cure when packaged as one-part systems, as it is difficult to expose the interior of such systems to atmospheric moisture. This difficulty may be overcome in two-part systems. However, two-part systems frequently require volume mix ratios of 10:1, which can be difficult to utilize. Low ratio systems have been developed, but these systems still have the drawback of producing the irritating by-products traditionally associated with moisture-cure systems.

U.S. Pat. No. 3,819,563 to Takago discloses room temperature vulcanizable siloxanes which are endcapped with enoxysilanes. U.S. Pat. No. 4,180,642, also to Takago, discloses a similar composition which includes a silane bearing a guanidine group. These patents provide siloxane compositions which are formed without the poisonous or noxious gases and other byproducts associated with other endcapping groups such as alkoxy groups. However, these compositions are one-part type compositions which rely on ambient moisture for their cure. Accordingly, the cure can take a significant amount of time. Moreover, because ambient moisture cures from the surface of the composition inward, it is difficult to achieve a homogenous cure.

U.S. Pat. No. 4,721,766 to Inoue discloses room temperature-curable siloxane compositions which are enoxy-endcapped, the compositions including guanidine-bearing silanes. U.S. Pat. No. 4,721,765, also to Inoue, discloses a similar composition which also includes an amino-containing silane. However, these compositions also suffer from the curing drawbacks of one-part type compositions.

U.S. Pat. No. 5,346,940, to Brassard, and assigned to Loctite Corporation, discloses a two-part silicone composition having a silanol terminated polyorganosiloxane, at 5% by weight of a tri or tetra methoxy or enoxy functional silane crosslinker, water, and a condensation catalyst. One part of the composition contains water and silanol terminated polydiorganosiloxane, and the other part is free of water and contains the crosslinker component. No reactive silicone component is present in either part.

U.S. Pat. No. 5,936,032 to Angus discloses a two-component room temperature vulcanizing silicone composition. The silicone composition may be mixed in low ratios, and is alkoxy endcapped. The compositions suffer the drawbacks associated with the noxious by-products resulting from the moisture-cure of alkoxy end-capped compositions.

Accordingly, there is a need for a two-part, low ratio siloxane composition which undergoes efficient moisture cure, while at the same time avoiding the offensive and irritating by-products traditionally associated with two-part systems.

SUMMARY OF THE INVENTION

In one aspect of the present invention, there is provided a two-part moisture-curing composition which includes a first part containing water and a hydroxy-terminated polydiorganosiloxane; and a second part which includes at least one reactive alkenoxy end-capped polydiorganosiloxane, at least one alkenoxy-containing silane cross-linker, at least an end-capping catalyst, and at least one moisture-cure catalyst. Desirably, some embodiments include in the second part, an enoxy end-capped polydiorganosiloxane and an enoxy-containing crosslinker.

In another aspect of the present invention, there is provided a method of preparing a silicone polymer which includes 1) admixing: a) a first part containing water and a hydroxy-terminated polydiorganosiloxane; with b) a second part containing a reactive alkenoxy end-capped polydiorganosiloxane, at least one alkenoxy-containing silane cross-linker, at least one end-capping catalyst, and at least one moisture-cure catalyst, and 2) permitting the first part and second part to react.

In still another aspect of the present invention, there is provided a silicone composition which includes the reaction product of: a) a first part containing water and a hydroxy-terminated polydiorganosiloxane; and b) a second part containing at least one reactive alkenoxy end-capped polydiorganosiloxane, at least one alkenoxy-containing silane cross-linker, at least one end-capping catalyst, and at least one moisture-cure catalyst.

DETAILED DESCRIPTION OF THE INVENTION

The compositions of the present invention are directed to two-part moisture curable silicone compositions. Each of the two-parts remain shelf stable until such time as they are combined together and permitted to react. The components of the invention may be mixed in low ratios to allow for easy dispensing of the product. This avoids some of the difficulties associated with conventional two-part adhesive systems, in which the components are mixed in ratios of 10:1 and higher. Additionally, as water is present in one of the components, cure occurs rapidly and uniformly upon mixing of the two components, in contrast to conventional moisture-cure systems, which rely solely on ambient environmental moisture for cure. The water-containing part of the composition also contains a hydroxy-terminated polydiorganosiloxane. The water can be directly added as "free" water, or carried on a filler material. The other part of the composition contains a moisture-curable silicone, at least one end-capping silane containing an enoxy group, at least one end-capping catalyst and at least one moisture cure catalyst. The cure speed of the compositions can be further adjusted by the inclusion of reactive silicones and/or end-capping silanes, either of which contain moisture carrying groups other than enoxy, for example alkoxy groups or other known moisture curing groups. In some embodiments, the speed of cure of enoxy-containing materials may be moderated by the inclusion of these additional types of moisture curing groups, either on the same molecule or through the incorporation of additional molecules.

A combination of reactive silicones, in the second part, as well as a combination of end-capping silanes is contemplated in the present invention.

The moisture curing compositions of the invention include two-parts, each of which is shelf stable, and which may be mixed with one another in low volume ratios to provide the compositions of the invention. The inventive compositions may be used in a variety of application areas including as adhesives, sealants, encapsulants, gaskets, potting compounds and as coatings, to name a few.

Included in the first part is a hydroxy-terminated polydiorganosiloxane. For the purposes of the invention, any conventional hydroxy-terminated polydiorganosiloxane can be incorporated into the present invention, especially those which consist essentially of repeating units of the formula:

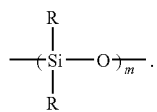

The second component of the moisture curing composition of the present invention includes a reactive silicone having the formula:

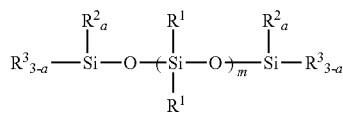

The number of repeating units, "m" plays a role in determining the molecular weight and the viscosity of the composition. Thus, m is an integer from about 1 to about 2,400, and in each occurrence, may be the same or different. Advantageously, m may be about 100 to about 1,200.

Each of R, $R^1$, and $R^2$ in the above formulas, independently, may be the same or different, and is a $C_1$ to $C_{10}$ hydrocarbon radical. R, $R^1$, and $R^2$ may be any such radical known to those skilled in the art, and is intended to include groups such as unsubstituted or substituted monovalent alkyl groups such as methyl, ethyl, propyl, and butyl groups; cycloalkyl groups such as a cyclohexyl group; alkenyl groups such as vinyl and allyl groups; and aryl groups, such as phenyl and tolyl groups; as well as those substituted groups obtained by replacing a part or all of the hydrogen atoms in the above-referenced hydrocarbon atoms with halogen atoms, cyano groups, and the like.

The reactive silicone allows for the two-parts of the composition of the invention to be mixed in low volume ratios. By adjusting the amount of reactive silicone included in the composition, the volume mix ratio may be increased or decreased, according to the situation's requirements. Suitable volume mix ratios of the first part of the composition to the second part of the composition range from about 4:1 to about 1:1. Advantageously, the volume mix ratio is from about 2:1 to about 1:1. More advantageously, the volume mix ratio is about 1:1. The ability to mix in such ratios is particularly favorable since it facilitates dispensing of the product.

Advantageously, R and $R^1$ are $C_1$ to $C_6$ alkyl. More advantageously, R and $R^1$ are methyl.

Advantageously, $R^2$ is $C_1$ to $C_4$ alkyl, vinyl, phenyl, and 3,3,3-trifluoropropyl, with vinyl being particularly advantageous.

One or both ends of the reactive silicone may be endcapped with an enoxy-containing silane. The enoxy group allows the compositions of the invention to undergo moisture cure. Moreover, use of an enoxy-containing silane helps avoid the creation of noxious by-products traditionally associated with moisture-curing compositions. The number of the enoxy groups present influences the cross-linking that the reactive silicone undergoes. As the variable "a" indicates the number of non-enoxy substituents, the variable "3-a" accordingly is the number of enoxy substituents. In each occurrence, "a" may be the same or different, and is 0, 1, or 2. Advantageously, "a" is 0 or 1.

The enoxy group is encompassed by substituent $R^3$. In each occurrence, $R^3$ may be the same or different, and is an alkenoxy group. Advantageously, $R^3$ is a $C_1$-$C_6$ alkenoxy group, with propenoxy being particularly desirable.

Also included in the second part of the composition is an end-capping enoxysilane having the formula:

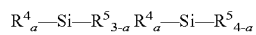

Upon mixing of the first part of the composition with the second part, among the reactions taking place, the end-capping silane of the second part reacts with the hydroxy-terminated polydiorganosiloxane of the first part, to form an end-capped polydiorganosiloxane. The end-capping silane is generally included in an amount of about 5% to about 10% by weight of the composition. Advantageously, the end-capping silane is included in an amount of about 6% to about 8% by weight. The endcapping silane contains an enoxy group, $R^5$. As noted above, the enoxy groups participate in cross-linking as the composition moisture-cures.

Substituent $R^4$ may be a $C_1$ to $C_{10}$ hydrocarbon radical. It may be present or absent, and in each occurrence may be the same or different. It may be any such radical known to those skilled in the art, and is intended to include groups such as unsubstituted or substituted monovalent alkyl groups such as methyl, ethyl, propyl, and butyl groups; cycloalkyl groups such as a cyclohexyl group; alkenyl groups such as vinyl and allyl groups; and aryl groups, such as phenyl and tolyl groups; as well as those substituted groups obtained by replacing a part or all of the hydrogen atoms in the above-referenced hydrocarbon atoms with halogen atoms, cyano groups, and the like. Advantageously, $R^4$ is $C_1$ to $C_4$ alkyl, vinyl, phenyl, with vinyl being particularly advantageous.

Substituent $R^5$ encompasses the enoxy portion of the end-capping silane. In each occurrence it may be the same or different, and may be an alkenoxy group having the structure:

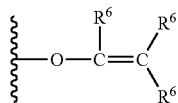

wherein $R^6$ in each occurrence can be the same or different and may be selected from the group consisting of H and $C_1$ to $C_3$ alkyl. In an advantageous embodiment, $R^5$ has the structure:

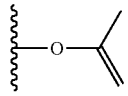

Examples of suitable end-capping silanes include vinyltriisopropenoxysilane, methyltriisopropenoxysilane, phenyltriisoprenoxysilane, and tetraisopropenoxysilane.

The second part of the composition also includes an end-capping catalyst. The end-capping catalyst may be any catalyst known to those skilled in the art which would promote coupling of the hydroxy-terminated polydiorganosiloxane with the end-capping silane. Advantageously, the end-capping catalyst is an amine compound. Illustrative examples of such an amine compound include pyridine, picoline, lutidine, pyrazine, piperidone, piperidine, piperazine, pyrazole, pyridazine, pyrimidine, pyrrolidine, butylamine, octylamine, laurylamine, dibutylamine, monoethanolamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole, 1,8-diazabicyclo[5,4,0]undecene (DBU), and salts of these amine compounds.

The end-capping catalyst is present in an amount sufficient to effectuate coupling of the hydroxy-terminated polydiorganosiloxane with the end-capping silane, and is generally present in amounts of about 0.0001% to about 5% by weight of the total composition.

The second part may optionally include an alkoxysilane having the structure:

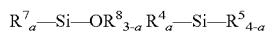

wherein $R^7$ may be a $C_1$ to $C_{10}$ hydrocarbon radical. It may be present or absent, and in each occurrence it may be the same or different. It may be any such radical known to those skilled in the art, and is intended to include groups such as unsubstituted or substituted monovalent alkyl groups such as methyl, ethyl, propyl, and butyl groups; cycloalkyl groups such as a cyclohexyl group; alkenyl groups such as vinyl and allyl groups; and aryl groups, such as phenyl and tolyl groups; as well as those substituted groups obtained by replacing a part or all of the hydrogen atoms in the above-referenced hydrocarbon atoms with halogen atoms, cyano groups, and the like. Advantageously, $R^7$ is $C_1$ to $C_4$ alkyl, vinyl, or phenyl.

$R^8$ may be a $C_1$ to $C_{10}$ alkyl radical. It may be any such radical known to those skilled in the art, and is intended to include groups such as unsubstituted or substituted monovalent alkyl groups such as methyl, ethyl, propyl, and butyl groups; cycloalkyl groups such as a cyclohexyl group; as well as those substituted groups obtained by replacing a part or all of the hydrogen atoms in the above-referenced alkyl groups with halogen atoms, cyano groups, alkoxy groups, and the like. Advantageously, $R^8$ is $C_1$ to $C_4$ alkyl, and —$CH_2CH_2OCH_3$.

Particularly advantageous alkoxy silanes useful in the present invention include vinyltrimethoxysilane and methyltrimethoxysilane.

Fillers will also be typically employed in the compositions of the invention. Illustrative examples include zirconium silicate, hydroxides such as those of calcium, aluminum, magnesium, iron and the like. Other fillers such as diatomaceous earth, carbonates such as sodium, potassium, calcium and magnesium may be employed. Calcium clay, graphite, and synthetic fibers may also be incorporated. Mixtures of fillers are contemplated. Desirable fillers are calcium carbonate, employed at levels of about 10% to about 25% by weight of the total composition. Suitably the filler is present in the second part of the composition.

Also included in the second part of the composition is a moisture-cure catalyst. Suitable moisture-cure catalysts include a metal compound such as titanium, tin, or zirconium compounds. Illustrative examples of the titanium compounds include tetraisopropoxy titanate and tetrabutoxy titanate. Illustrative examples of the tin compounds include dibutyltin dilaurate, dibutyltin diacetate, and dibutyltin dioctoate. Illustrative examples of the zirconium compounds includes zirconium octanoate. The moisture-cure catalysts are employed in an amount sufficient to effectuate moisture cure, which generally is from about 0.05% to about 5.00% by weight, and advantageously from about 0.5% to about 2.5% by weight.

The compositions of the invention cure rapidly. Typically, upon mixing, they will be substantially cured within about 20 minutes, and frequently can achieve substantial cure within about 5 to about 10 minutes. Full cure may be achieved within 24 hours.

The water, which participates in the moisture cure is included in the first part of the composition. The water is present in an amount sufficient to effectuate rapid and complete cure of the silicone composition upon mixing, and may be proportional to the amount of endcapping silane used. The amount of water may be in the range of about 0.1% to about 2.0% by weight of the total composition. Advantageously, the water may be present in an amount of about 0.5% to about 1.5% by weight of the total composition. The water may be supplied directly or in the form of a moisture-containing filler, or both. Advantageously, the water is included in the form of a moisture-containing filler.

The inventive compositions may also contain other additives so long as they do not inhibit the curing mechanism or intended use. For example, conventional additives such as promoters, pigments, moisture scavengers, inhibitors, odor masks, and the like may be included.

The inventive compositions may also contain one or more amino-containing silane compounds which act as adhesion promoters. These amino-containing silane compounds may be present in amounts of about 0.1% to about 5.0% by weight of the composition. Desirably, these compounds are present in amounts of about 0.74% to about 1.4% by weight of the composition. Amino-containing silane compounds which are useful in the present invention include, but are not limited to, silane compounds containing amino-alkyl groups, such as gamma-ureidopropyltrimethoxy silane, 3-aminopropyl trimethoxysilane, N,N'-bis(3-trimethoxy silylpropyl)urea, gamma-aminopropyltrimethoxysilane, N-(2-aminoethyl)-3-aminopropyltriethoxysilane, N-(2-aminoethyl)-3-aminopropyltrimethoxysilane, timethoxysilylpropyldiethylene triamine, tertiary alkyl carbamate silane, and aminoethyl-3-aminopropyl-methyl-dimethylsilane. Other desirable amino-containing silane compounds include silane compounds containing amino-cycloaliphatic groups such as methyl tris (cyclohexylamino)silane and silane compounds containing amino-aromatic groups such as methyl tris-(N-methylbenzamido)silane. Adhesion promoters may be present in amounts of up to about 5%, and desirably up to about 2% by weight.

Examples of useful commercially available adhesion promoters include octyl trimethoxysilane (commercially available from Witco Corporation, Greenwich, Conn. under the trade designation A-137), glycidyl trimethoxysilane (commercially available from Witco under the trade designation A-187), methacryloxypropyl trimethoxysilane (commercially available from Witco under the trade designation of A-174), vinyl trimethoxysilane, tetraethoxysilane and its partial condensation products, and combinations thereof.

In an advantageous aspect, the hydroxy terminated polydiorganosiloxane of the first part may have the structure:

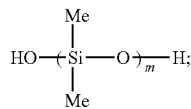

the reactive silicone of the second part may have the structure:

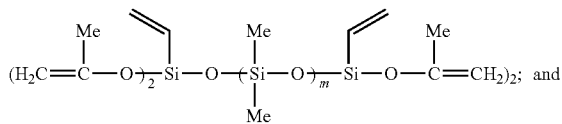

the end-capping silane may be vinyltriisopropenoxysilane.

A further aspect of the present invention provides a method for using the composition of the invention to join or seal two substrates, including the steps of:
 a) mixing the first part and the second part;
 b) applying the composition to at least one of two substrate surfaces;
 c) mating the two substrate surfaces in an abutting relationship to form an assembly; and
 d) maintaining the abutting relationship for a time sufficient to allow the composition to cure.

In another aspect, the invention provides a silicone composition which includes the reaction product of:
 a) a first part comprising water and a hydroxy-terminated polydiorganosiloxane; and
 b) a second part comprising:
  i. a reactive silicone having the formula:

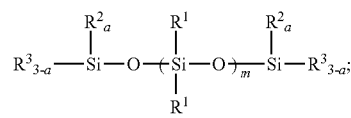

ii. an end-capping silane having the formula

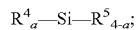

iii. an end-capping catalyst; and
  iv. a moisture-cure catalyst,
  wherein a, m, $R^1$, $R^2$, $R^3$, $R^4$, $R^5$, the end-capping catalyst, and the moisture-cure catalyst are as described hereinabove.

EXAMPLES

The following examples illustrate various aspects of the invention. Percentages are based on the weight of the total composition, unless otherwise stated. Tables 1, 2, and 3 present various compositions of the invention.

Inventive Compositions

TABLE 1

| COMPONENT | WEIGHT % COMPOSITION | | | | | |
|---|---|---|---|---|---|---|
| | A | B | C | D | E | F |
| Volume Mix Ratio, First Part:Second Part | 4:1 | 4:1 | 4:1 | 4:1 | 4:1 | 4:1 |
| First Part | | | | | | |
| Hydroxyl terminated polydiorganosiloxane[1] | 66.0 | 66.0 | 66.0 | 62.0 | 55.0 | 66.0 |
| Precipitated Calcium Carbonate Containing 0.9%-1% water | 34.0 | 34.0 | 34.0 | 0 | 45.0 | 34.0 |
| Calcium Carbonate | — | — | — | 37.5 | — | — |
| Water | * | * | * | 0.5 | * | * |
| Second Part | | | | | | |
| Hydroxyl terminated polydiorganosiloxane[1] | 61.0 | 61.0 | 61.0 | 61.0 | 55.0 | 60.9 |
| Precipitated Silica | 14.0 | 14.0 | 14.0 | 14.0 | 20.0 | 14.0 |
| Carbon Black | — | — | — | — | — | 0.1 |
| Enoxy silane, Vinyltriisopropenoxysilane | 1.0 | 4.0 | 7.0 | 1.0 | 1.0 | 1.0 |
| 1,8-Diazabicyclo{5,4,0}-Undec-7-ene; DBU | 0.1 | 0.1 | 0.1 | 0.1 | 0.1 | — |
| 1,1,3,3-tetramethylguanidine (TMG) | — | — | — | — | — | 0.1 |

TABLE 1-continued

| COMPONENT | WEIGHT % COMPOSITION | | | | | |
| --- | --- | --- | --- | --- | --- | --- |
| | A | B | C | D | E | F |
| Vinyltrimethoxysilane | 5.0 | 10.0 | 17.3 | 5.0 | 5.0 | 5.0 |
| Tetraethyl orthosilicate | 18.3 | 10.3 | 0.0 | 18.3 | 17.3 | 18.3 |
| Ureidopropyltrimethoxysilane | — | — | — | — | 1.0 | — |
| Cure Catalyst; Alkyl tin carboxylate | 0.6 | 0.6 | 0.6 | 0.6 | 0.6 | 0.6 |

[1]polydimethylsiloxane

Compositions A, B and C demonstrate how the composition cure speed can be increased by modifying the levels and quantities of endcapping used in the invention. The water is incorporated in these formulations by using a calcium carbonate filler already containing about 0.9% to 1.0% water. Composition A started to gel in about 5-6 hours; B started to gel in about 1-2 hours; and C started to gel in less than about 30 minutes. Composition D is an example of using a ground calcium carbonate filler where water is added separately to the composition. Composition E is an improved strength and adhesion version of composition A. Composition F shows the use of an alternative amine end-capping catalyst in addition to adding a filler to change the color from clear to black for the second part.

Inventive Compositions

TABLE 2

| COMPONENT | WEIGHT % COMPOSITION | | | | | |
| --- | --- | --- | --- | --- | --- | --- |
| | G | H | I | J | K | L |
| Volume Mix Ratio, Part A to Part B | 4:1 | 4:1 | 4:1 | 2:1 | 2:1 | 1:1 |
| Part A | | | | | | |
| Hydroxyl terminated polydiorganosiloxane[1] | 66.0 | 66.0 | 66.0 | 66.0 | 55.0 | 55.0 |
| Precipitated Calcium Carbonate Containing 0.9%-1% water | 34.0 | 34.0 | 34.0 | 34.0 | 45.0 | 45.0 |
| Water | * | * | * | * | * | * |
| Part B | | | | | | |
| Hydroxyl terminated polydiorganosiloxane[1] | 41.0 | 42.0 | 51.0 | 61.5 | 52.5 | 51 |
| Precipitated Silica | — | — | 20.0 | 20.0 | — | 20.0 |
| Calcium Carbonate | 34.0 | 30.1 | — | — | 30.0 | — |
| Enoxy silane, Vinyltriisopropenoxysilane | 1.0 | 1.0 | 1.5 | 1.5 | 1.0 | 1.5 |
| DBU; 1,8-Diazabicyclo{5,4,0}-Undec-7-ene | 0.1 | — | 0.1 | 0.1 | 0.1 | 0.1 |
| 1,1,3,3-tetramethylguanidine (TMG) | — | 0.1 | — | — | — | — |
| Vinyltrimethoxysilane | 5.0 | 1.5 | 7.0 | 6.0 | 6.0 | 3.0 |
| Tetraethyl orthosilicate | 18.3 | 24.5 | 19.8 | 10.0 | 10.0 | 5.0 |
| Ureidopropyltrimethoxysilane | — | — | — | 0.5 | — | — |
| Cure Catalyst; Alkyl tin carboxylate | 0.6 | 0.8 | 0.6 | 0.4 | 0.4 | 0.2 |

[1]polydimethylsiloxane

Composition G is an example where the precipitated silica was replaced by dry calcium carbonate. Composition H changes both the filler and end-capping catalyst in addition to ratio of additional crosslinkers and condensation catalysts to still meet the desired profile. Composition I also represents a particularly desirable embodiment of the invention. Compositions J, K & L demonstrate how part B changes when going from a 4:1 ratio product to 1:1 ratio product.

Inventive Compositions

TABLE 3

| COMPONENT | WEIGHT % COMPOSITION | | | | | |
| --- | --- | --- | --- | --- | --- | --- |
| | M | N | O | P | Q | R |
| Volume Mix Ratio, Part A to Part B | 4:1 | 4:1 | 4:1 | 2:1 | 2:1 | 1:1 |
| Part A | | | | | | |
| Hydroxyl terminated polydiorganosiloxane[1] | 55.0 | 55.0 | 60.0 | 55.0 | 55.0 | 55.0 |
| Precipitated Calcium Carbonate (Stearic Acid Treated) containing 0.9%-1% water | 45.0 | 45.0 | 40.0 | 45.0 | 45.0 | 45.0 |
| Water | * | * | * | * | * | * |

TABLE 3-continued

| COMPONENT | WEIGHT % COMPOSITION | | | | | |
|---|---|---|---|---|---|---|
| | M | N | O | P | Q | R |
| Part B | | | | | | |
| Hydroxyl terminated polydiorganosiloxane[1] | 17.86 | 19.5 | 30.0 | 26.0 | 30.6 | 32.5 |
| Silica Filler | 2.0 | — | — | — | — | 2.0 |
| Calcium Carbonate | 54.0 | 50.0 | 45.4 | 56.0 | 50.0 | 54.0 |
| Enoxy silane, Vinyltriisopropenoxysilane | 1.5 | 1.5 | 6.0 | 1.5 | 1.5 | 1.5 |
| 1,8-Diazabicyclo{5,4,0}-Undec-7-ene; DBU | 0.1 | 0.1 | 0.1 | 0.1 | 0.1 | 0.1 |
| Vinyltrimethoxysilane | — | 7.0 | 9.0 | — | 5.0 | 1.5 |
| Tetraethyl orthosilicate | 24.0 | 19.3 | 9.0 | 16.0 | 12.5 | 8.2 |
| Ureidopropyltrimethoxysilane | — | 2.0 | — | — | — | — |
| Cure Catalyst; Alkyl tin carboxylate | 0.54 | 0.6 | 0.5 | 0.4 | 0.3 | 0.2 |

[1]polydimethylsiloxane

Composition M represents a thixotropic version of the invention. The compositions in Table 3 show a significant increase in the amount of precipitated calcium carbonate filler (water-containing) used as compared to the compositions of prior tables. Compositions N and O exhibited faster curing properties as compared to other compositions and also exhibited better adhesion properties. Compositions P and Q show modifications in composition as the ratio changes from 4:1 to 2:1. Composition R is a 1:1 ratio formulation and as the ratio goes from 4:1 to 1:1, physical properties such as tensile strength can be altered by keeping part A the same.

The invention claimed is:

1. A two-part moisture-curing composition comprising:
   a) first part comprising water and a hydroxy-terminated polydiorganosiloxane; and
   b) a second part comprising:
      i. a reactive silicone having the formula:

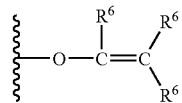

wherein
   a is 0, 1, or 2;
   m is from about 1 to about 2,400;
   $R^1$ in each occurrence may be the same or different and is a $C_1$ to $C_{10}$ hydrocarbon radical;
   $R^2$ in each occurrence may be the same or different and is a $C_1$ to $C_{10}$ hydrocarbon radical; and
   $R^3$ is a alkenoxy group; and
      ii. at least one end-capping silane having the formula

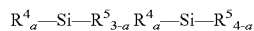

wherein
   a is 0, 1, or 2;
   $R^4$ is a $C_1$ to $C_{10}$ hydrocarbon radical;
   $R^5$ is a alkenoxy group having the structure:

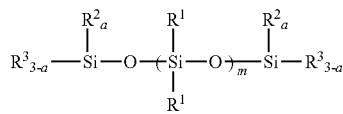

wherein $R^6$ in each occurrence can be the same or different and is selected from the group consisting of H and $C_1$ to $C_3$ alkyl; and
      iii. at least one end-capping catalyst; and
      iv. at least one moisture-cure catalyst.

2. The composition of claim 1, wherein the second part further comprises a hydroxy-terminated polydiorganosiloxane.

3. The composition of claim 1, wherein the second part further comprises an alkoxysilane.

4. The composition of claim 1, wherein the volume mix ratio of the first part to the second part is from about 4:1 to about 1:1.

5. The composition of claim 4, wherein the volume mix ratio is 1:1.

6. The composition of claim 1, wherein the water of the first part is present in a filler.

7. The composition of claim 1, wherein
   $R^1$ and $R^2$ may be the same or different, and are selected consisting of $C_1$ to $C_4$ alkyl, vinyl, and phenyl; and
   $R^3$ is

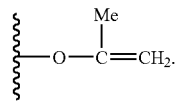

8. The composition of claim 1, wherein
   a is 1
   $R^1$ is methyl;
   $R^2$ is vinyl;
   $R^3$ is

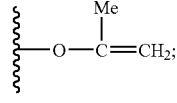

the end-capping silane of the second part is vinyltriisopropenoxysilane;
the end capping-catalyst is an amine catalyst; and
the moisture-cure catalyst is a tin-based catalyst.

9. The composition of claim 1, further comprising a filler.

10. The composition of claim 1, further comprising a plasticizer.

11. The composition of claim 1, further comprising adhesion promoters.

12. A method for using the composition of claim 1 to join or seal two substrates comprising the steps of:
   a) mixing the first part and the second part;
   b) applying the composition to at least one of two substrate surfaces;
   c) mating the two substrate surfaces in an abutting relationship to form an assembly; and
   d) maintaining the abutting relationship for a time sufficient to allow the composition to cure.

13. A method of preparing a silicone polymer comprising admixing:
   a) a first part comprising water and a hydroxy-terminated polydiorganosiloxane; with
   b) a second part comprising:
      i. a reactive silicone having the formula:

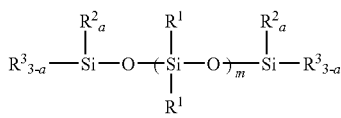

wherein
   a is 0, 1, or 2;
   m is 1 to about 2,400;
   $R^1$ in each occurrence may be the same or different and is a $C_1$ to $C_{10}$ hydrocarbon radical;
   $R^2$ in each occurrence may be the same or different and is a $C_1$ to $C_{10}$ hydrocarbon radical; and
   $R^3$ is a alkenoxy group; and
      ii. at least one end-capping silane having the formula

wherein
   a is 0, 1, or 2;
   $R^4$ is a $C_1$ to $C_{10}$ hydrocarbon radical;
   $R^5$ is a alkenoxy group having the structure:

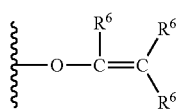

wherein $R^6$ in each occurrence can be the same or different and is selected from the group consisting of H and $C_1$ to $C_3$ alkyl; and
      iii. at least one end-capping catalyst; and
      iv. at least one moisture-cure catalyst;
   and permitting the first part and second part to react.

14. The method of claim 13, wherein the mix ratio of the first part to the second part is from about 4:1 to about 1:1.

15. A silicone composition comprising the reaction product of:
   a) a first part comprising water and a hydroxy-terminated polydiorganosiloxane; and
   b) a second part comprising:
      i. a reactive silicone having the formula:

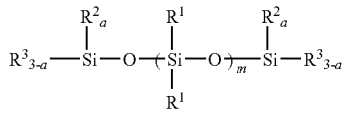

wherein
   a is 0, 1, or 2;
   m is 1 to about 2,400;
   $R^1$ in each occurrence may be the same or different and is a $C_1$ to $C_{10}$ hydrocarbon radical;
   $R^2$ in each occurrence may be the same or different and is a $C_1$ to $C_{10}$ hydrocarbon radical;
   $R^3$ is a alkenoxy group; and
      ii. at least one end-capping silane having the formula:

$R^4{}_a$—Si—$R^5{}_{4-a}$ wherein
   a is 0, 1, or 2;
   $R^4$ is a $C_1$ to $C_{10}$ hydrocarbon radical; and
   $R^5$ is an alkenoxy group having the structure:

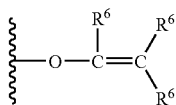

wherein $R^6$ in each occurrence can be the same or different and is selected from the group consisting of H and $C_1$ to $C_3$ alkyl;
      iii. at least one end-capping catalyst; and
      iv. at least one moisture-cure catalyst.

16. The composition of claim 15, wherein the volume mix ratio of the first part to the second part is from about 4:1 to about 1:1.

17. The composition of claim 15, wherein the second part further comprises a hydroxy-terminated polydiorganosiloxane.

18. The composition of claim 15, wherein the second part further comprises an alkoxysilane.

* * * * *